(12) United States Patent
Park

(10) Patent No.: US 9,794,640 B2
(45) Date of Patent: Oct. 17, 2017

(54) SIGNAL PROCESSING APPARATUS, SIGNAL PROCESSING METHOD, AND BROADCASTING SYSTEM INCLUDING THE SIGNAL PROCESSING APPARATUS

(71) Applicant: Samsung Electronics Co., Ltd., Suwon-si, Gyeonggi-do (KR)

(72) Inventor: Hyun-Jin Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/869,226

(22) Filed: Sep. 29, 2015

(65) Prior Publication Data

US 2016/0112767 A1 Apr. 21, 2016

(30) Foreign Application Priority Data

Oct. 16, 2014 (KR) .................. 10-2014-0139588

(51) Int. Cl.
*H04N 7/173* (2011.01)
*H04N 21/6543* (2011.01)
*H04N 21/438* (2011.01)
*H04N 21/44* (2011.01)

(52) U.S. Cl.
CPC ..... *H04N 21/6543* (2013.01); *H04N 21/4383* (2013.01); *H04N 21/44008* (2013.01)

(58) Field of Classification Search
CPC ........... H04N 21/6543; H04N 21/4383; H04N 21/44008
USPC ........................................................ 725/116
See application file for complete search history.

(56) References Cited

U.S. PATENT DOCUMENTS

| 7,436,811 | B2* | 10/2008 | Putcha | H04W 72/005 |
| | | | | 370/343 |
| 7,971,224 | B2* | 6/2011 | Maetz | H04N 21/235 |
| | | | | 725/109 |
| 8,255,969 | B2* | 8/2012 | Nam | H04N 21/4345 |
| | | | | 725/100 |
| 8,462,645 | B1* | 6/2013 | Harb | G06Q 30/0241 |
| | | | | 370/252 |
| 8,479,253 | B2* | 7/2013 | Glen | G09G 5/006 |
| | | | | 348/552 |
| 2002/0162115 | A1* | 10/2002 | Bruckner | H04N 7/17318 |
| | | | | 725/105 |
| 2002/0162117 | A1* | 10/2002 | Pearson | H04N 5/445 |
| | | | | 725/109 |
| 2002/0162120 | A1* | 10/2002 | Mitchell | H04N 7/165 |
| | | | | 725/135 |
| 2003/0025832 | A1* | 2/2003 | Swart | H04N 7/17318 |
| | | | | 348/461 |
| 2009/0193486 | A1* | 7/2009 | Patel | H04N 5/76 |
| | | | | 725/114 |

(Continued)

FOREIGN PATENT DOCUMENTS

KR 2019950027707 10/1995
KR 1020110060532 11/2009

*Primary Examiner* — Michael B Pierorazio
(74) *Attorney, Agent, or Firm* — Staas & Halsey LLP

(57) ABSTRACT

Disclosed herein is a signal processing apparatus including a receiving unit configured to receive a signal transmitted through a media channel and a controller configured to determine whether the signal includes a data download command and to change a channel of the receiving unit to receive data when the signal includes the data download command.

18 Claims, 12 Drawing Sheets

(56) References Cited

U.S. PATENT DOCUMENTS

| | | | | |
|---|---|---|---|---|
| 2009/0276805 | A1* | 11/2009 | Andrews, II | G06Q 30/02 725/35 |
| 2010/0033635 | A1* | 2/2010 | Stumpf | H04N 21/23424 348/705 |
| 2010/0095339 | A1* | 4/2010 | Rattin | H04L 12/2801 725/111 |
| 2010/0175102 | A1* | 7/2010 | Kuang | G08C 17/00 725/141 |
| 2010/0254370 | A1* | 10/2010 | Jana | H04L 65/1016 370/352 |
| 2011/0214156 | A1* | 9/2011 | Desmicht | H04N 5/44 725/151 |
| 2013/0019266 | A1* | 1/2013 | Doyle | H04N 21/42209 725/47 |
| 2013/0305292 | A1* | 11/2013 | Chen | H04N 21/472 725/54 |
| 2013/0346511 | A1* | 12/2013 | Park | G06Q 10/10 709/206 |
| 2014/0115627 | A1* | 4/2014 | Lee | H04N 21/812 725/34 |
| 2014/0181229 | A1* | 6/2014 | Tucker | H04L 12/1827 709/206 |
| 2014/0286354 | A1* | 9/2014 | Van De Poel | G06F 9/542 370/463 |
| 2016/0112769 | A1* | 4/2016 | Adam | H04N 21/4345 725/38 |

\* cited by examiner

SIGNAL PROCESSING APPARATUS, SIGNAL PROCESSING METHOD, AND BROADCASTING SYSTEM INCLUDING THE SIGNAL PROCESSING APPARATUS

CROSS-REFERENCE TO RELATED APPLICATIONS

This application claims the benefit of Korean Patent Application No. 10-2014-0139588, filed on Oct. 16, 2014 in the Korean Intellectual Property Office, the disclosure of which is incorporated herein by reference.

BACKGROUND

1. Field

Embodiments of the present disclosure relate to a signal processing apparatus to receive media and data.

2. Description of the Related Art

Display apparatuses have been used to provide more diverse information with the development of information and communication technologies. For example, display apparatuses have recently been used as digital information display (DID) apparatuses or digital signage (DS) apparatuses. Digital signage refers to digital media providing information, entertainment, advertisements, and the like by installing digital display apparatuses remotely controlled via a network in public or commercial area. A variety of IT and contents-related technologies are combined in DS apparatuses to provide contents, networks, and software solutions in addition to functions of the DID providing digital information.

Thus, there is a need to develop a method of efficiently downloading data to provide more diverse information by using the display apparatuses.

SUMMARY

Therefore, it is an aspect of the present disclosure to provide a signal processing apparatus to receive media and data, a signal processing method, and a broadcasting system including the signal processing apparatus.

Additional aspects of the disclosure will be set forth in part in the description which follows and, in part, will be obvious from the description, or may be learned by practice of the disclosure.

In accordance with one aspect of the present disclosure, a signal processing apparatus includes a receiving unit configured to receive a signal transmitted through a media channel, and a controller configured to determine whether the signal includes a data download command and to change a channel of the receiving unit to receive data when the signal includes the data download command.

The controller may generate a media image based on the signal and determine whether the media image includes a command pattern corresponding to the data download command.

The controller may determine whether the signal includes the data download command by comparing a histogram of the media image and a second histogram of the command pattern.

The controller may determine whether a streaming signal includes a command code corresponding to the data download command.

The controller may change the channel of the receiving unit into or to a preset data channel to receive the data.

The controller may change the channel of the receiving unit in accordance with channel information included in the data download command.

The controller may change the channel of the receiving unit into the media channel when data download is terminated.

The signal processing apparatus may further include a storage unit configured to store data, and the controller may control the receiving unit to store the data in the storage unit.

The data may include program data to drive the signal processing apparatus and information data including supplementary information to be provided to a user.

The controller may control a display apparatus to display the media image generated based on the signal and the supplementary information.

In accordance with another aspect of the present disclosure, a method of processing a signal includes receiving a media by receiving a signal transmitted through a media channel, determining whether the signal includes a data download command, and receiving data by changing a currently receiving channel to receive data when the signal includes the data download command.

The determining may include generating a media image based on the signal, and determining whether the media image includes a command pattern corresponding to the data download command.

The determining whether the media image includes the command pattern may include generating a first histogram of the media image, and comparing the first histogram with a second histogram of the command pattern.

The receiving of data may include changing the currently receiving channel based on information about a data channel included in the data download command.

The method may further include changing the currently receiving channel into the media channel when the receiving of data is terminated.

In accordance with another aspect of the present disclosure, a broadcasting system includes a transmitting apparatus configured to transmit a media signal through a media channel and transmit a data signal through a data channel, a signal processing apparatus configured to change a currently receiving channel into the data channel when the media signal includes a data download command, and a display apparatus configured to display a screen in accordance with a control of the signal processing apparatus.

The display apparatus may display a media image generated based on the media signal and supplementary information included in the data signal.

The data signal may include a substitute image to be displayed on the display apparatus while data is downloaded.

According to the signal processing apparatus, the signal processing method and the broadcasting system including the signal processing apparatus, data may be downloaded without performing additional manipulation.

In accordance with another aspect of the present disclosure, a method of processing a signal includes receiving a media signal through a media channel, and switching reception to a data channel when the media signal includes a data command. The method may also include generating an image using the media signal as controlled by control data downloaded pursuant to the data command.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF THE PREFERRED EMBODIMENTS

Figure 1:
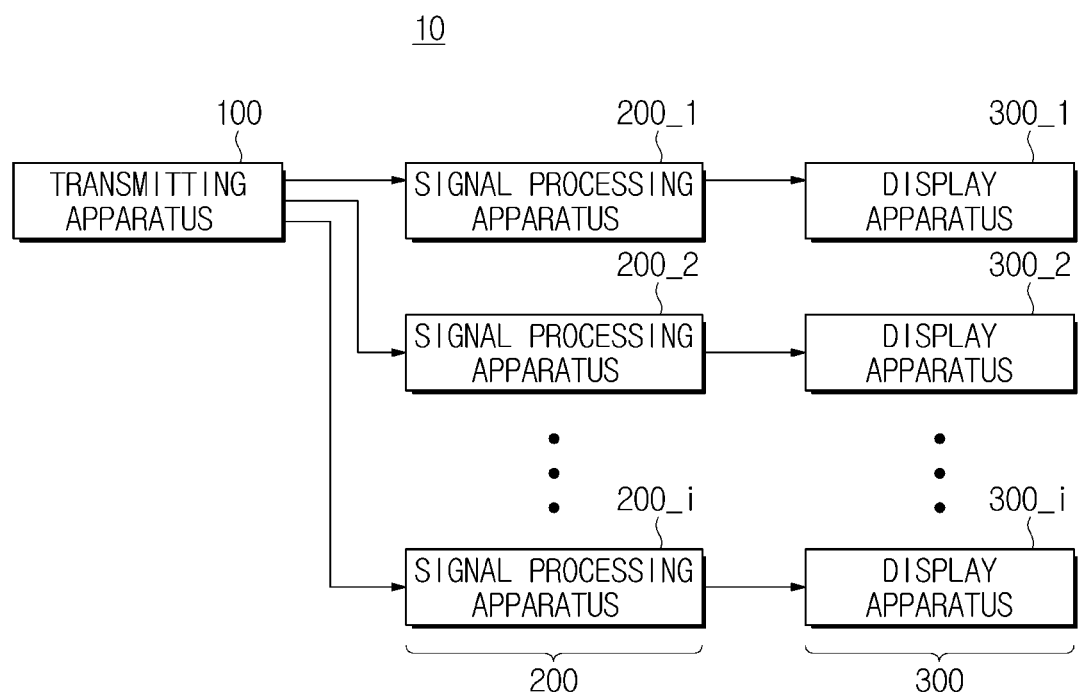
FIG. 1 is a block diagram illustrating a broadcasting system according to an embodiment.

Reference will now be made in detail to the embodiments of the present disclosure, examples of which are illustrated in the accompanying drawings, wherein like reference numerals refer to like elements throughout. The present disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art.

The terms used in the specification will be described briefly, and then embodiments will be described in detail.

The terms used in this specification are selected from currently widely used general terms in consideration of functions of the present disclosure, but may vary according to the intentions or practices of those skilled in the art or the advent of new technology. Additionally, in certain cases, there may be terms that an applicant may arbitrarily select, and in this case, their meanings are described below. Accordingly, the terms used in this specification should be interpreted on the basis of substantial implications that the terms have and the contents across this specification not the simple names of the terms.

Throughout the specification, the term "comprising" an element do not preclude the other elements but further includes an element unless otherwise stated. In addition, the terms "unit" and "module" as used herein, refer to units to perform at least one function or operation, and may be implemented using a software component, a hardware component such as a FPGA or ASIC, or any combination thereof. However, the "unit" and "module" are not limited to the software or hardware component. The "unit" and "module" may be configured to reside on the addressable storage medium and configured to execute on one or more processors. Thus, the terms "unit" and "module" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Hereinafter, the present disclosure will be described in detail by explaining exemplary embodiments of the present disclosure with reference to the attached drawings. In the drawings, parts unrelated to the descriptions are omitted for clear description of the present disclosure.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items.

FIG. 1 is a block diagram illustrating a broadcasting system according to an embodiment.

Referring to FIG. 1, a broadcasting system 10 includes a transmitting apparatus 100 configured to transmit a signal, a signal processing apparatus 200, such as a computer, configured to receive the signal from the transmitting apparatus 100, and a display apparatus 300 operating in accordance with an output signal of the signal processing apparatus 200.

The transmitting apparatus 100 may convert media to be displayed on the display apparatus 300 and data required to drive the display apparatus 300 into predetermined signals and transmit the converted signals.

The term "media" as used herein refers to contents output through the display apparatus 300 in real time. For example, the media may be a broadcast transmitted from a broadcasting station in real time.

The data required to drive the display apparatus 300 may include program data required to directly drive the signal processing apparatus 200 or the display apparatus 300, such as, firmware and applications, and information data about supplementary information, such as advertisements, news, and weather, provided to a user via the display apparatus 300.

The transmitting apparatus 100 may transmit a signal using a streaming method. Particularly, the transmitting apparatus 100 generates and transmits a media streaming signal such that the media is displayed on the display apparatus 300 in real time. The transmitting apparatus 100 may also generate a data streaming signal by partitioning the signal and transmit the data streaming signal.

In addition, the transmitting apparatus 100 may simultaneously transmit a media streaming signal and the data streaming signal. Particularly, the transmitting apparatus 100 may simultaneously transmit the media streaming signal and the data streaming signal by allocating the media streaming signal and the data streaming signal to different channels.

Hereinafter, a channel to which the media streaming signal is allocated is referred to as a media channel and a channel to which the data streaming signal is allocated is referred to as a data channel for descriptive convenience.

The transmitting apparatus 100 may also simultaneously transmit a plurality of media by allocating different media to different channels. For example, the transmitting apparatus 100 may simultaneously transmit media A received from broadcasting station A and media B received from broadcasting station B by allocating them to different channels.

In addition, when the display apparatus 300 needs to download data, the transmitting apparatus 100 may create a download command and transmit the download command in a state where it is included in the media streaming signal.

By transmitting the download command in the media streaming signal, a plurality of signal processing apparatuses 200_1 to 200_i may download data simultaneously. That is, signal processing apparatus 200 may download data at a time without separate manipulation.

The signal processing apparatus 200 receives the media streaming signal from the transmitting apparatus 100. The plurality of signal processing apparatuses 200_1 to 200_i, which receive the signals transmitted from the transmitting apparatus 100, are connected to a plurality of display apparatuses 300_1 to 300_i, respectively.

The signal processing apparatus 200 processes the received media streaming signal and outputs an output signal such that the display apparatus 300 connected thereto displays the media.

In this regard, the signal processing apparatus 200 may receive only a media streaming signal of a selected media channel among the plurality of media channels. Since the transmitting apparatus 100 may simultaneously transmit a plurality of media by using a plurality of channels as described above, the signal processing apparatus 200 may select a desired media by selecting the corresponding media channel.

That is, the signal processing apparatus 200 may determine a media to be displayed on the display apparatus 300 via channel selection.

In addition, the signal processing apparatus 200 may determine whether the received media streaming signal includes the download command and download data upon determination that the download command is included therein. That is, the signal processing apparatus 200 may change the currently receiving channel into or to a data channel to receive the data streaming signal.

In this case, the download command may further include information related to data download such as the data channel through which data is transmitted, size of data to be downloaded, and data transmission time.

In addition, the signal processing apparatus 200 may update firmware or applications by using program data received through the data channel. The signal processing apparatus 200 may also update firmware or applications of the display apparatus 300 by using program data.

For example, the signal processing apparatus 200 may transmit program data to the display apparatus 300, and the display apparatus 300 may be updated based on the program data received from the signal processing apparatus 200. The signal processing apparatus 200 may also update firmware or applications of the display apparatus 300 by controlling the display apparatus 300.

The signal processing apparatus 200 may generate an output signal to display supplementary information included in information data received from the transmitting apparatus 100. For example, the signal processing apparatus 200 may generate the output signal such that the supplementary information, such as advertisements, news, and weather, are displayed together with the media.

The display apparatus 300 operates based on the output signal of the signal processing apparatus 200. That is, the display apparatus 300 may display at least one of the media and supplementary information.

The display apparatus 300 may also display information data received via the signal processing apparatus 200. In this case, although information data may be stored in the display apparatus 300, embodiments of the present disclosure will be described on the assumption that information data is stored in the signal processing apparatus 200 for descriptive convenience.

The display apparatus 300 may also receive program data from the signal processing apparatus 200 and update firmware or applications by using the received program data.

Figure 2:
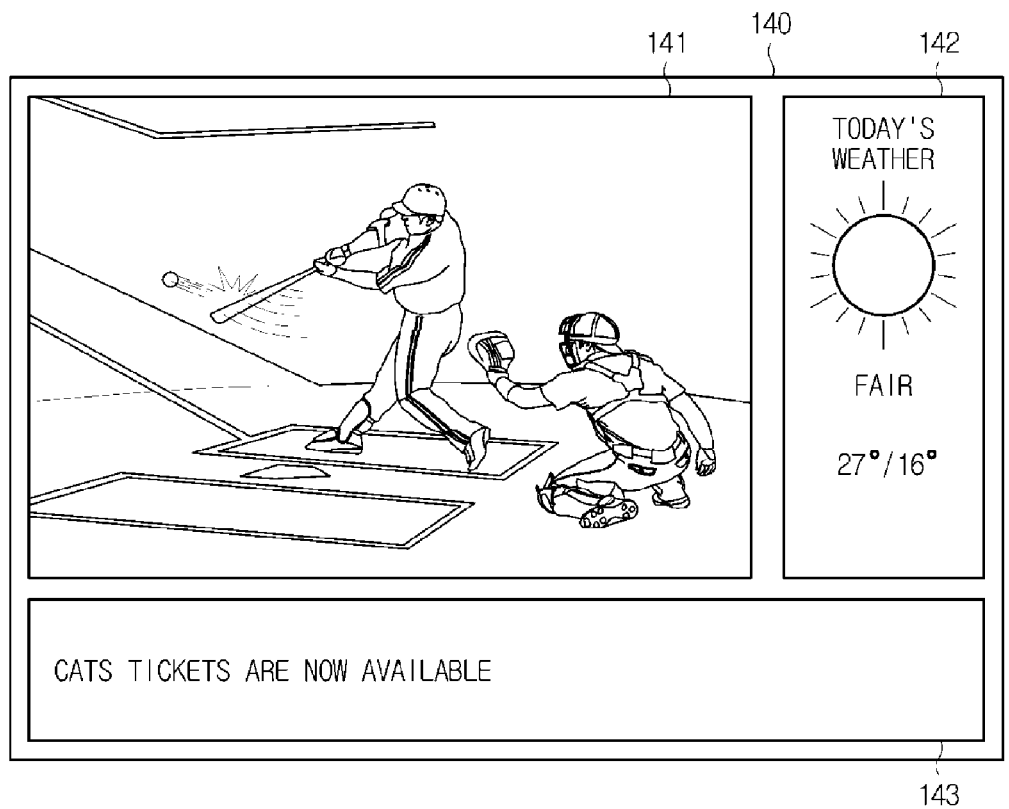
FIG. 2 is a diagram illustrating a configuration of a screen of a display apparatus according to an embodiment.

Meanwhile, the display apparatus 300 may simultaneously display the media and supplementary information included in the information data. FIG. 2 is a diagram illustrating a configuration of a screen of a display apparatus according to an embodiment.

Referring to FIG. 2, the screen 140 of the display apparatus 300 may be divided into a plurality of regions 141, 142, and 143. In this case, media may be displayed in a first region 141 and supplementary information included in information data may be displayed in second region 142 and third region 143. Particularly, a media image generated based on the media signal received through a predetermined channel may be displayed in the first region 141, information about weather included in information data may be displayed in the second region 142, and an advertisement included in the information data may be displayed on the third region 142.

The supplementary information provided together with the media may be related to the media displayed on the display apparatus 300 or related to a user of the display apparatus 300.

Also, the display apparatus 300 may be implemented using a display device, such as a plasma display panel (PDP), a liquid crystal display (LCD) panel, a light emitting diode (LED) panel, an organic light emitting diode (OLED) panel, an active-matrix organic light-emitting diode (AMOLED) panel, and a projector or a sound output device such as a speaker, without being limited thereto. Hereinafter, constituent elements of the broadcasting system 10 according to an embodiment will be described in detail.

Figure 3:
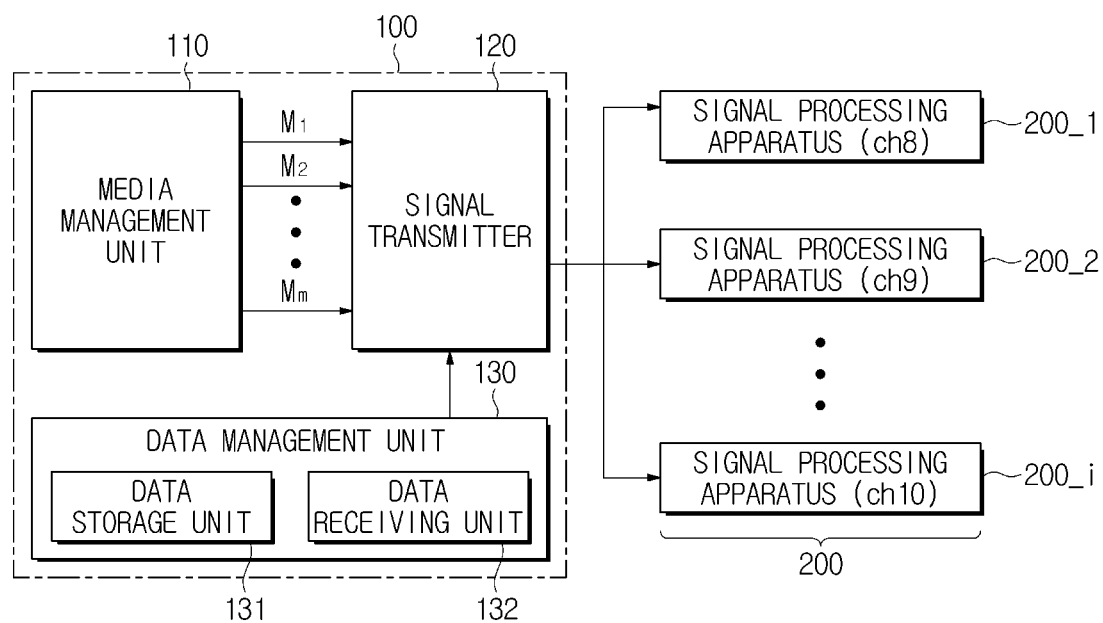
FIG. 3 is a control block diagram for describing a transmitting apparatus of a broadcasting system according to an embodiment.

FIG. 3 is a control block diagram for describing a transmitting apparatus of a broadcasting system according to an embodiment.

Figure 4:
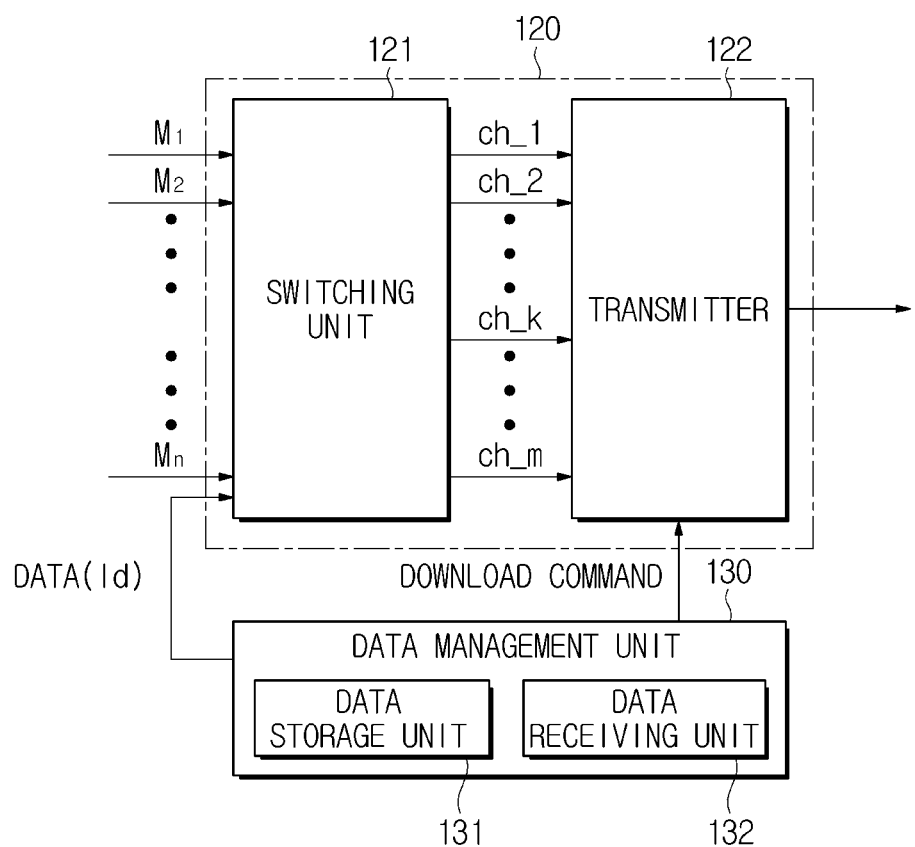
FIG. 4 is a control block diagram for describing channel setting of a transmitting apparatus of a broadcasting system according to an embodiment.

FIG. 4 is a control block diagram for describing channel setting of a transmitting apparatus of a broadcasting system according to an embodiment.

Referring to FIG. 3, the transmitting apparatus 100 may include a media management unit 110, such as a computer, configured to manage media M1 to Mn, a data management unit 130, such as a computer, configured to manage data, and a signal transmitter 120 configured to transmit a streaming signal.

The media management unit 110 manages media to be transmitted from the signal transmitter 120. That is, the media management unit 110 manages media M1 to Mn to be displayed on the display apparatus 300. The media management unit 110 may pre-process the media M1 to Mn to be transmitted from the signal transmitter 120.

Since the signal transmitter 120 may simultaneously transmit a plurality of media M1 to Mn by using a plurality of channels, the media management unit 110 may simultaneously input the plurality of media M1 to Mn to the signal transmitter 120.

The media M1 to Mn managed by the media management unit 110 may be pre-stored media or media received from another device. For example, if the media is broadcasts transmitted from a plurality of broadcasting stations, the media management unit 110 may receive the broadcasts transmitted from the plurality of broadcasting stations. In order to receive the broadcasts, the media management unit 110 may include a tuner to receive broadcast signals transmitted from the broadcasting stations and a demodulator to demodulate the received broadcast signals.

The data management unit 130 manages data. The data management unit 130 may further include a data storage unit 131 to store data and a data receiving unit 132 to receive data from another device.

In this regard, the data storage unit 131 may include a high-speed random access memory, magnetic disk, static random access memory (SRAM), dynamic random access memory (DRAM), or read-only memory (ROM), without being limited thereto. Also, the data storage unit 131 may be detachable from the transmitting apparatus 100. For example, the data storage unit 131 may include a compact flash (CF) card, a secure digital (SD) Card, a smart media (SM) card, a multimedia card (MMC), or a memory stick, without being limited thereto.

The data stored in the data management unit 130 may be transmitted via the signal transmitter 120. In addition, the data management unit 130 may pre-process data to be transmitted via the signal transmitter 120, if required.

The signal transmitter 120 transmits media and data. The signal transmitter 120 may transmit media and data by using any method without limitation. Hereinafter, embodiments of the present disclosure will be described under the assumption that the signal transmitter 120 transmits media and data by a radio communication method for descriptive convenience.

The signal transmitter 120 may divide a radio frequency band into a plurality of channels and simultaneously transmit the plurality of media M1 to Mn and data Id by using the plurality of channels. Hereinafter, operation of the signal transmitter 120 will be described in detail with reference to FIG. 4.

The signal transmitter 120 may include a switching unit 121 configured to determine channels ch_1 to ch_m used to receive the plurality of media M1 to Mn and data Id and a transmitter 122 configured to transmit streaming signals.

The switching unit 121 may determine channels to receive the plurality of media M1 to Mn and data Id. In this regard, a channel used to transmit the media is referred to as a media channel, and a channel used to transmit the data is referred to as a data channel. The media channel and data channel may be different.

For example, the switching unit 121 may allocate a first media M1 to an eighth channel ch_8, such that the first media M1 is transmitted through the eighth channel ch_8, and may allocate a second media M2 to ninth and tenth channels ch_9 and ch_10 such that the second media M2 is transmitted through the ninth and tenth channels ch_9 and ch_10. By the channel allocation as described above, a first signal processing apparatus 200_1 receiving the eighth channel ch_8 receives a first media streaming signal, and a second signal processing apparatus 200_2 receiving the ninth channel ch_9 and $i^{th}$ signal processing apparatus 200_i receiving the tenth channel ch_10 receive a second media streaming signal.

Also, the switching unit 121 may determine a data channel used to transmit data among the plurality of channels ch_1 to ch_m. For example, the switching unit 121 may map a $k^{th}$ channel ch_k as the data channel.

The transmitter 122 transmits the plurality of media M1 to Mn and data through the channels ch_1 to ch_m mapped by the switching unit 121. The transmitter 122 may perform pre-processing for transmitting of the media M1 to Mn and data Id. For example, the transmitter 122 generates the media streaming signal by allocating the media M1 to Mn and generates the data streaming signal by allocating the data such that the media M1 to Mn and data are transmitted using a streaming method.

Figure 5:
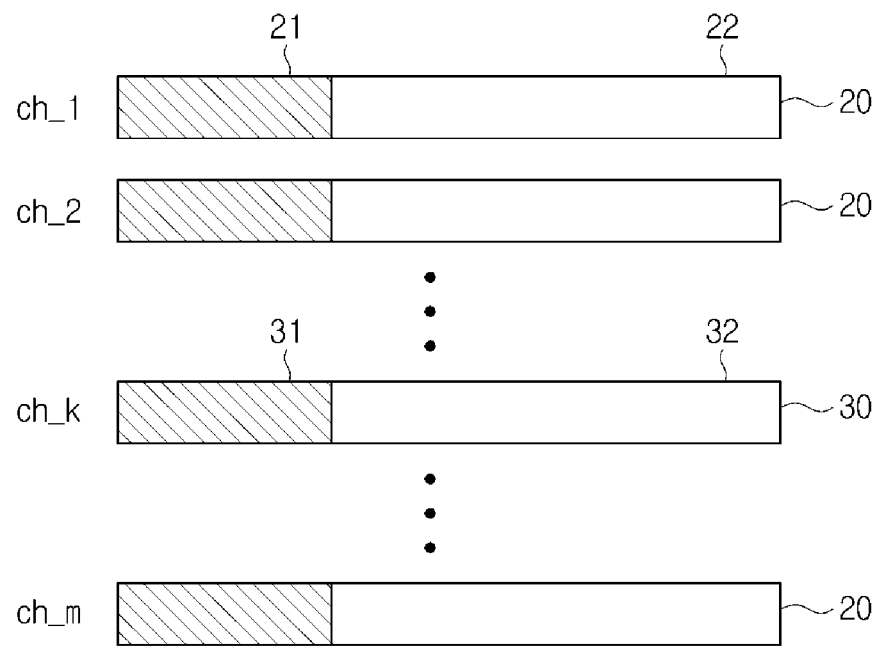
FIG. 5 is a diagram for describing a signal transmitted from a transmitter according to an embodiment.

FIG. 5 is a diagram for describing a signal transmitted from a transmitter according to an embodiment.

Figure 6:
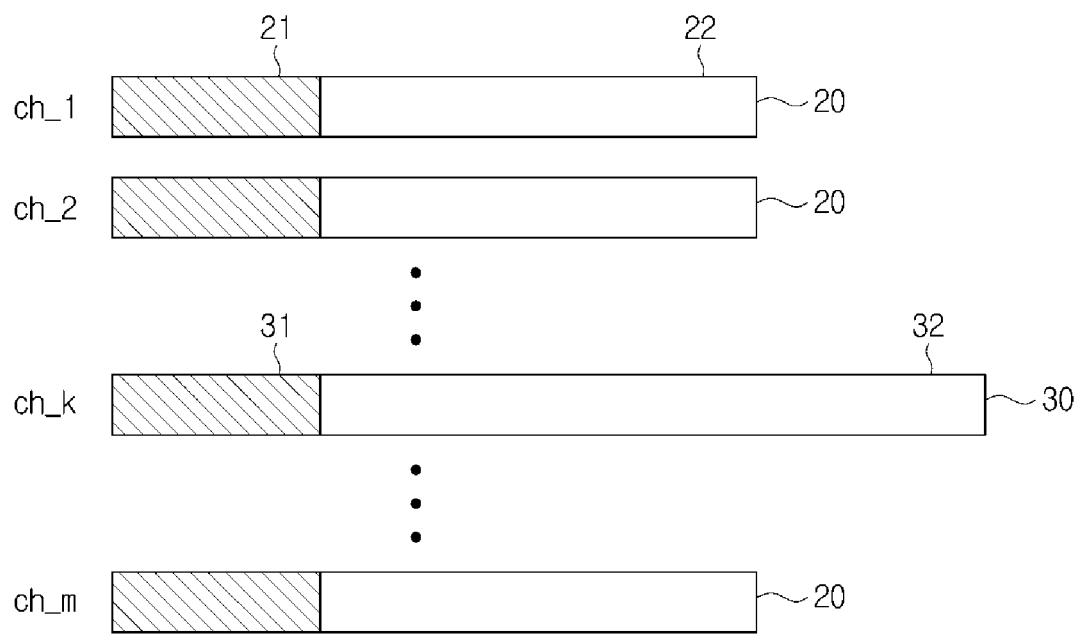
FIG. 6 is a diagram for describing a signal transmitted from a transmitter according to another embodiment.

FIG. 6 is a diagram for describing a signal transmitted from a transmitter according to another embodiment.

Figure 7:
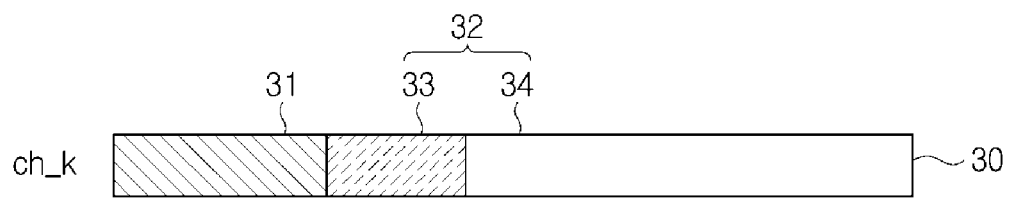
FIG. 7 is a diagram for describing a data streaming signal of FIG. 6 in detail.

FIG. 7 is a diagram for describing the data streaming signal of FIG. 6 in detail.

Referring to FIG. 5, the transmitter 122 may simultaneously transmit a plurality of signals 20 and 30 through the plurality of channels ch_1 to ch_m. Particularly, a media streaming signal 20 is transmitted through the media channel and a data streaming signal 30 is transmitted through the data channel.

The media streaming signal 20 may include a first header portion 21 including packet information and a first signal portion 22 including media information. The data streaming signal 30 may include a second header portion 31 including packet information and a second signal portion 32 including data information.

Although FIG. 5 illustrates that the media streaming signal 20 and the data streaming signal 30 as having the same length, the length of the media streaming signal 20 may be different from that of the data streaming signal 30.

Particularly, as illustrated in FIGS. 6 and 7, the length of the data streaming signal 30 may be greater than that of the media streaming signal 20. In this case, the second signal portion 32 of the data streaming signal 30 may include a substitute image portion 33 including information about a substitute image to be displayed on the display apparatus 300 while data is downloaded and a data portion 34 including data information.

Referring back to FIG. 4, the data management unit 130 may create a download command if data transmission is required. Since the media channel through which media is transmitted and the data channel through which data is transmitted are different as described above, the channel needs to be changed for data download. Thus, the data management unit 130 may create the download command to allow the signal processing apparatus 200 to change the channel.

Figure 8:
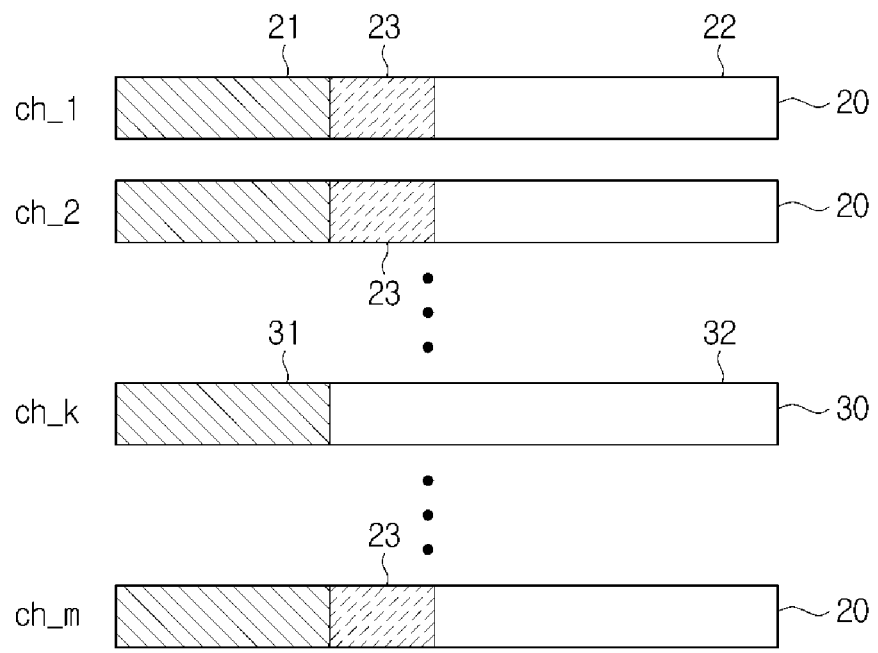
FIG. 8 is a diagram for describing transmission of a download command.

FIG. 8 is a diagram for describing transmission of a download command.

Referring to FIGS. 4 and 8, the transmitter 122 transmits a download command 23 generated by the data management unit 130. Particularly, the transmitter 122 transmits the download command 23 in a state of being included in the media streaming signal 20. In this case, the transmitter 122 may transmit the download command 23 through all media channels as illustrated in FIG. 8. However, the transmitter 122 may also transmit the download command 23 through only a channel determined by the data management unit 130.

Figure 9:
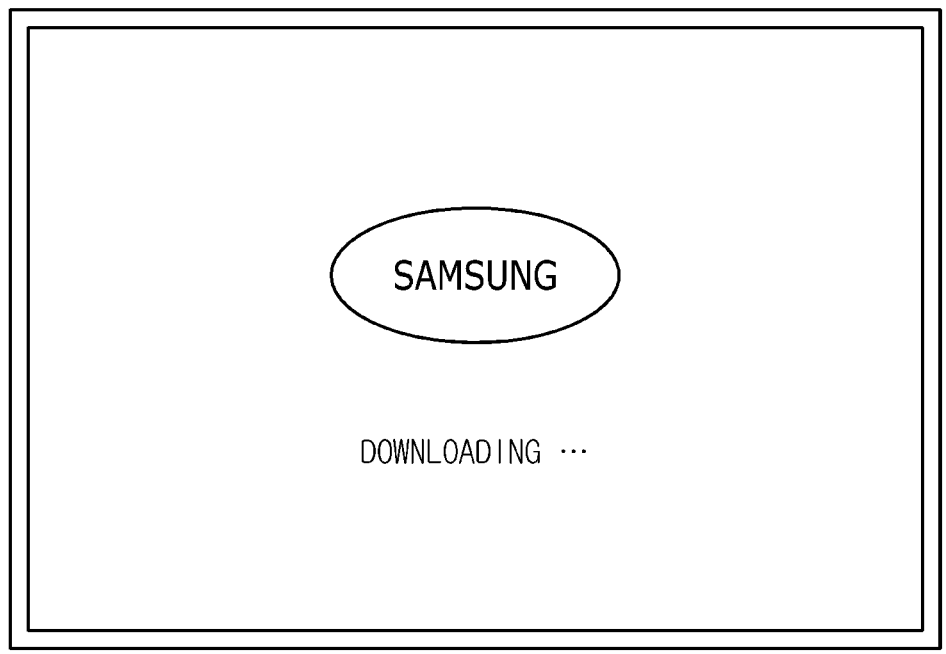
FIG. 9 is a diagram for describing a configuration of a screen of a display apparatus according to another embodiment.
Figure 10:
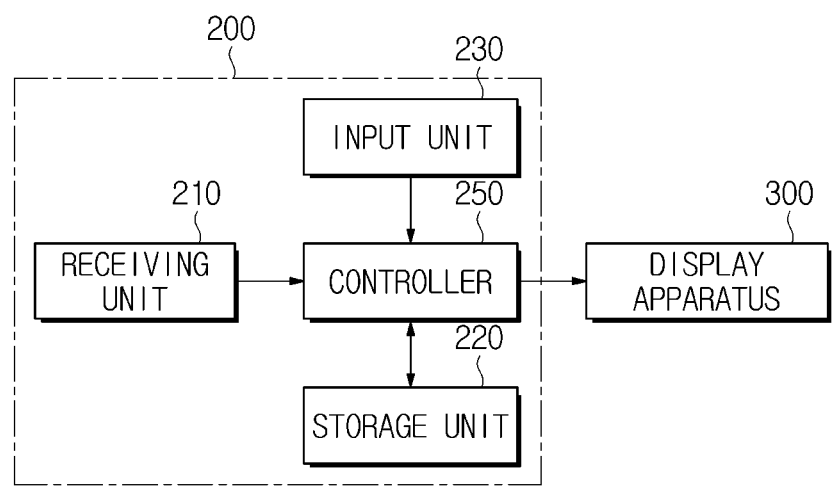
FIG. 10 is a block diagram illustrating a signal processing apparatus of a broadcasting system according to an embodiment.

Hereinafter, the signal processing apparatus 200 will be described in more detail. FIG. 9 is a diagram for describing a configuration of a screen of a display apparatus according to another embodiment. FIG. 10 is a block diagram illustrating a signal processing apparatus of a broadcasting system according to an embodiment.

The signal processing apparatus 200 may include a receiving unit 210 configured to receive a signal, a storage unit 220 configured to store information required to operate the signal processing apparatus 200, an input unit 230 configured to receive a control command, and a controller 250, such as a computer, configured to control overall operation of the signal processing apparatus 200.

The receiving unit 210 receives a signal from the transmitting apparatus 100. The receiving unit 210 may include a tuner to receive a streaming signal and a demodulator to demodulate the received streaming signal. The tuner may selectively receive a streaming signal of a selected channel among streaming signals transmitted through a plurality of channels.

Also, the receiving unit 210 may receive a plurality of streaming signals by including a plurality of tuners. For example, one tuner may receive a first media through an eighth channel and another tuner may receive a second media through a ninth channel. That is, when the receiving unit 210 includes the plurality of tuners, a plurality of media may be simultaneously received. Thus, the plurality of media may be displayed on the display apparatus 300.

In addition, one of the plurality of tuners may receive the media streaming signal through the media channel, and another tuner may receive the data streaming signal through the data channel. If the media streaming signal and the data streaming signal are simultaneously received using the plurality of tuners, the media may be displayed while data is downloaded.

The storage unit 220 may store a variety of information required to drive the signal processing apparatus 200. For example, the storage unit 220 may store an operating system or various applications required to drive the signal processing apparatus 200 and data generated for operation of the signal processing apparatus 200.

The storage unit 220 may also store the media or data received from the transmitting apparatus 100. The storage unit 220 may include a high-speed random access memory, magnetic disk, static random access memory (SRAM), dynamic random access memory (DRAM), or read-only memory (ROM), without being limited thereto.

The input unit 230 receives a control command. The user may control the signal processing apparatus 200 via the input unit 230. For example, the user may change the channel of the media to be received via the input unit 230.

The controller 250 control overall operation of the signal processing apparatus 200. The controller 250 may control the receiving unit 210 to receive a streaming signal transmitted through a selected channel.

Particularly, the controller 250 may generate an image signal by processing the media streaming signal received by the receiving unit 210 to be displayed on the display apparatus 300. The controller 250 may transmit the generated image signal to the display apparatus 300.

In addition, the controller 250 may determine whether the download command is received. Since the transmitting apparatus 100 transmits the download command if data download is required as described above, the controller 250 may download data upon receiving the download command.

To this end, the controller 250 may determine whether a predetermined download command is included in the received media streaming signal. Hereinafter, an example of determining whether the download command is included will be described in detail.

According to an embodiment, the controller 250 may determine whether a predetermined command code is included in the media streaming signal. In this case, the predetermined command code may be transmitted in a state of being included in the first signal portion of the media streaming signal. For example, when the predetermined command code is "10001001110001101", the controller 250 may search the first signal portion of the media streaming signal for "10001001110001101".

According to another embodiment, the controller 250 may determine whether a predetermined command pattern is received based on the media streaming signal. As described above, the download command may be a command pattern expressible as an image. The controller 250 may determine whether the command pattern is received by generating a media image based on the received media streaming signal and determining whether the media image includes the command pattern via comparison between the generated media image and the command pattern.

According to another embodiment, the controller 250 may determine whether the command pattern is received by comparing a histogram of the command pattern with a histogram of the media image. The controller 250 may determine whether the download command is received by comparing a histogram of the command pattern preset as the download command and a histogram generated based on the received media streaming signal.

Particularly, the controller 250 generates a histogram by analyzing the media image generated based on the media streaming signal and determines that the download command is received when a difference between the generated histogram and the histogram of the command pattern is less than a threshold value.

Meanwhile, the controller 250 downloads data when the download command is received. The channel of the receiving unit 210 may be changed for data download. Since the media channel is different from the data channel as described above, the controller 250 may download data by changing the current channel into or to the data channel. In this case, information about the data channel may be pre-set or included in the download command as described above.

Particularly, the controller 250 may decode data based on a plurality of data streaming signal continuously received through the data channel and store the decoded data in the storage unit 220. The stored data may be transmitted to the display apparatus 300.

In addition, the controller 250 may download data based on download-related information included in the download command. For example, the controller 250 may download data by changing the current channel into or to the channel included in the download command, determine whether to terminate the data download based on the size of data included in the download command, or download data only for the time included in the download command.

As described above, when the controller 250 changes the media channel into or to the data channel, the media streaming signal is not received. Thus, the controller 250 may transmit a substitute image signal to the display apparatus 300 such that a pre-stored substitute image is displayed on the display apparatus 300.

Meanwhile, when the data streaming signal 30 includes the substitute image as illustrated in FIG. 8, the controller 250 may generate the substitute image based on the data streaming signal 30 and transmit the image signal to the display apparatus 300 such that the substitute image is displayed as illustrated in FIG. 9.

In addition, the controller 250 may determine whether the data download is terminated and re-start receiving of the media when the data download is terminated. For example, when the data download is terminated, the controller 250 changes the current channel into or to the media channel to re-start receiving of the media.

Figure 11:
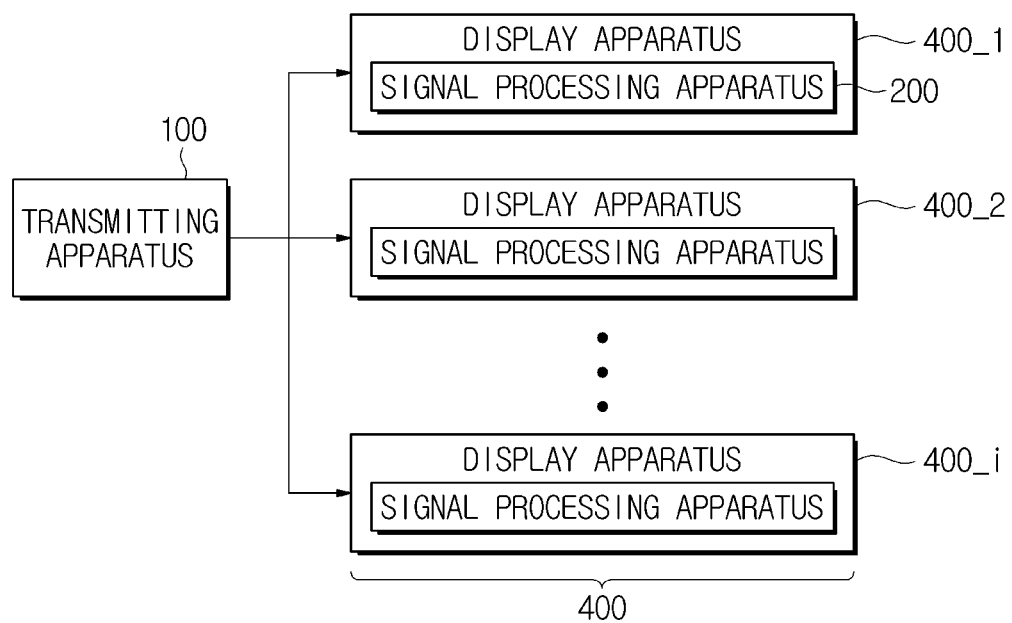
FIG. 11 is a block diagram illustrating a broadcasting system according to another embodiment.

FIG. 11 is a block diagram illustrating a broadcasting system according to another embodiment.

Although the signal processing apparatus 200 and the display apparatus 300 are separated from each other in the broadcasting system 10 according to the embodiment illustrated in FIGS. 1 to 10, the signal processing apparatus 200 may be integrated with the display apparatus 400 in the broadcasting system illustrated in FIG. 11.

For example, as illustrated in FIG. 11, a signal processing apparatus 200 may be disposed in a display apparatus 400.

Figure 12:
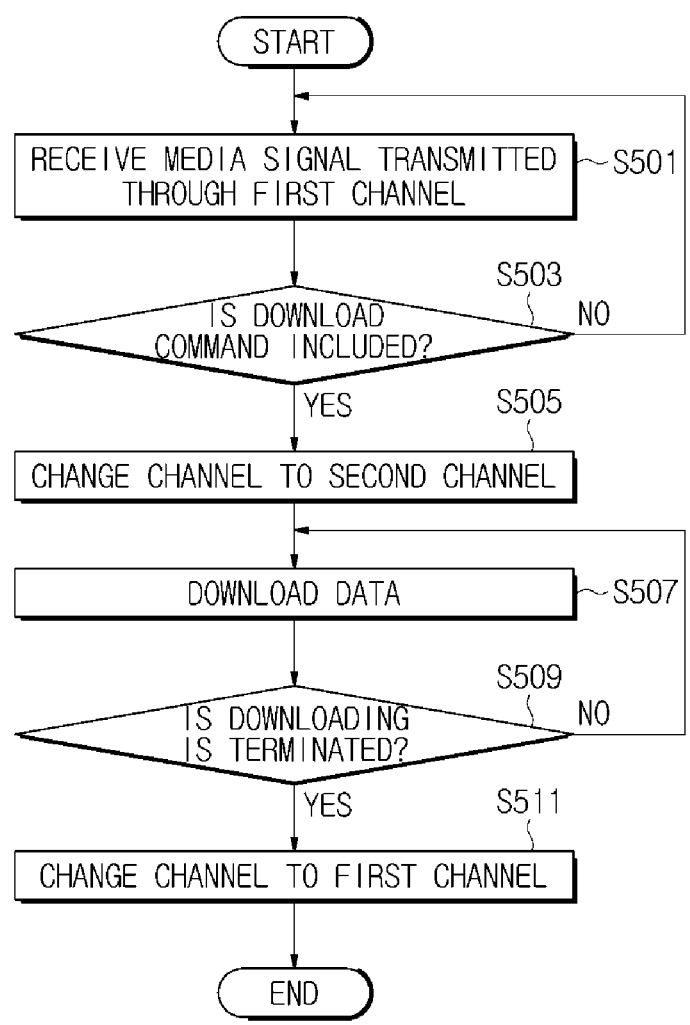
FIG. 12 is a flowchart for describing a signal processing method in a broadcasting system according to an embodiment.

FIG. 12 is a flowchart for describing a signal processing method in a broadcasting system according to an embodiment and which may be stored on a non-transitory storage medium.

As illustrated in FIG. 12, the signal processing apparatus 200 receives a media signal transmitted through a first channel (S501). In this regard, the media signal may be a media streaming signal processed such that the media signal is transmitted using a streaming method. Since the transmitting apparatus 100 receives the plurality of media through the plurality of channels as described above, the signal processing apparatus 200 receives the media signal transmitted through the selected first channel.

Also, the signal processing apparatus 200 may generate a media image based on the media signal, and the media image may be displayed on the display apparatus 400.

The signal processing apparatus 200 determines whether the received media signal includes a download command (S503). As described above, the transmitting apparatus 100 transmits the download command in a state of being included in the media signal if data download is required. The signal processing apparatus 200 may determine whether a predetermined download command is included in the received media signal.

A method of determining whether the download command is included may vary according to types of the download command.

For example, when the download command is a command code, the signal processing apparatus 200 may confirm that the download command is received by comparing the predetermined command code of the media signal with the media signal.

When the download command is a command pattern expressible as an image, the signal processing apparatus 200 may generate a media image based on the media signal and determines whether the command pattern is included in the media image by comparing the generated media image with the command pattern. Also, the signal processing apparatus 200 may determine whether the download command is received according to similarity of histograms. Particularly, the signal processing apparatus 200 may compare a histogram of the command pattern with a histogram of the media image and determine that the download command is included when similarity of the histogram of the command pattern and the histogram of the media image is greater than a predetermined level.

When the download command is not included (No of 501), the signal processing apparatus 200 receives the media signal transmitted through the first channel (S501).

Meanwhile, when the download command is included (Yes of S501), the signal processing apparatus 200 changes the first channel into or to a second channel (S505). In this regard, the second channel is a data channel allocated to receive data and may be pre-set in the signal processing apparatus 200. When the download command includes information about the data channel, the signal processing apparatus 200 may determine the data channel included in the download command as the second channel.

The signal processing apparatus 200 downloads data transmitted through the second channel (S507). Data may also be received in the form of the data streaming signal processed using a streaming method in the same manner as the media. The signal processing apparatus 200 may generate data from the data streaming signal sequentially received through the second channel.

In this case, the display apparatus 300 may display a substitute image. Here, the substitute image may be pre-stored in the signal processing apparatus 200 or received via the data streaming signal.

The signal processing apparatus 200 determines whether the download is terminated (S509). Termination of the download may be determined based on contents of a header portion of the data streaming signal or based on the download command. For example, the signal processing apparatus 200 may determine termination of the data download based on the size of data included in the download command or may download data only for a time included in the download command.

When the download is not terminated (No of S509), the signal processing apparatus 200 downloads data through the second channel (S507).

When the download is terminated (Yes of S509), the signal processing apparatus 200 changes the second channel into or to the first channel (S511). Supplementary information included in the data downloaded through the second channel may be displayed on the display apparatus 300. In addition, the display apparatus 300 may simultaneously display the supplementary information included in the downloaded data and the media received through the first channel.

If the downloaded data is program data required to drive the signal processing apparatus 200, the signal processing apparatus 200 may perform an update based on the program data.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A signal processing apparatus, comprising:
a receiving unit configured to receive a signal transmitted through a media channel; and
a controller configured to determine whether the signal comprises a data download command and to change a channel of the receiving unit to receive data when the signal comprises the data download command,
wherein the data comprises program data including at least one of firmware and applications, and supplementary information data including at least one of advertisement, news, and weather,
wherein the controller generates a media image based on the signal and determines whether the media image comprises a command pattern corresponding to the data download command, and
wherein the controller determines whether the signal comprises the data download command by using both the media image and the command pattern.

2. The signal processing apparatus according to claim 1, wherein the controller determines whether the signal comprises the data download command by comparing a media image histogram of the media image and a command pattern histogram of the command pattern.

3. The signal processing apparatus according to claim 1, wherein the controller determines whether the signal comprises a command code corresponding to the data download command.

4. The signal processing apparatus according to claim 1, wherein the controller changes the channel of the receiving unit to a preset data channel to receive the data.

5. The signal processing apparatus according to claim 1, wherein the controller changes the channel of the receiving unit in accordance with channel information included in the data download command.

6. The signal processing apparatus according to claim 1, wherein the controller changes the channel of the receiving unit to the media channel when data download is terminated.

7. The signal processing apparatus according to claim 1, further comprising a storage unit configured to store data,
wherein the controller controls the receiving unit to store the received data in the storage unit.

8. The signal processing apparatus according to claim 1, wherein the program data is to drive the signal processing apparatus and the supplementary information is to be provided to a user.

9. The signal processing apparatus according to claim 8, wherein the controller controls a display apparatus to display a media image generated based on the signal and the supplementary information.

10. The signal processing apparatus according to claim 4, wherein a data signal received through the data channel further comprises a substitute image to be displayed while the data is being received.

11. A method of processing a signal, the method comprising:
receiving a media by receiving a signal transmitted through a media channel;
determining whether the signal comprises a data download command; and
receiving data by changing a currently receiving channel to receive data when the signal comprises the data download command,
wherein the data comprises program data including at least one of firmware and applications, and supplementary information data including at least one of advertisement, news, and weather,
wherein the determining whether the signal comprises a data download command comprises:
generating a media image based on the signal; and
determining whether the media image comprises a command pattern corresponding to the data download command, and
wherein determining whether the media image comprises a command pattern corresponding to the data download command comprises determining whether the signal comprises the data download command by using both the media image and the command pattern.

12. The method according to claim 11, wherein the determining whether the media image comprises the command pattern comprises:
generating a first histogram of the media image; and
comparing the first histogram with a second histogram of the command pattern.

13. The method according to claim 11, wherein the receiving of data comprises changing the currently receiving channel based on information about a data channel included in the data download command.

14. The method according to claim 11, further comprises changing the currently receiving channel to the media channel when the receiving of data is terminated.

15. A broadcasting system, comprising:
a transmitting apparatus configured to transmit a media signal through a media channel and transmit a data signal through a data channel;
a signal processing apparatus configured to change a currently receiving channel to the data channel when the media signal comprises a data download command; and
a display apparatus configured to display a screen in accordance with a control of the signal processing apparatus,
wherein data comprises program data including at least one of firmware and applications, and supplementary information data including at least one of advertisement, news, and weather,
wherein the signal processing apparatus generates a media image based on the signal and determines whether the media image comprises a command pattern corresponding to the data download command, and
wherein the signal processing apparatus determines whether the signal comprises the data download command by using the media image and the command pattern.

16. The broadcasting system according to claim 15, wherein the display apparatus displays a media image generated based on the media signal and supplementary information included in the data signal.

17. The broadcasting system according to claim 15, wherein the data signal comprises a substitute image to be displayed on the display apparatus while data is downloaded.

18. A method, comprising:
receiving a media signal through a media channel; determining whether the media signal comprises a data download command; and
switching reception to a data channel for downloading data when the media signal comprises the data download command; and
generating an image using the media signal as controlled by control data downloaded pursuant to the data command,
wherein the data comprises program data including at least one of firmware and applications, and supplementary information data including at least one of advertisement, news, and weather,
wherein the determining whether the media signal comprises a data download command comprises:
  generating a media image based on the signal; and
  determining whether the media image comprises a command pattern corresponding to the data download command, and
wherein the determining whether the media image comprises the command pattern comprises determining whether the signal comprises the data download command by using both the media image and the command pattern.

* * * * *